United States Patent [19]

(12) United States Patent
Aoki et al.

(10) Patent No.: US 10,587,854 B2
(45) Date of Patent: Mar. 10, 2020

(54) IMAGING APPARATUS AND CONTROL METHOD THEREOF

(71) Applicant: FUJIFILM Corporation, Tokyo (JP)

(72) Inventors: Takashi Aoki, Saitama (JP); Atsushi Misawa, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 12 days.

(21) Appl. No.: 15/981,313

(22) Filed: May 16, 2018

(65) Prior Publication Data

US 2018/0262733 A1    Sep. 13, 2018

Related U.S. Application Data

(63) Continuation of application No. PCT/JP2016/083781, filed on Nov. 15, 2016.

(30) Foreign Application Priority Data

Nov. 18, 2015 (JP) .................................. 2015-225961

(51) Int. Cl.
*H04N 9/73* (2006.01)
*G03B 17/20* (2006.01)
(Continued)

(52) U.S. Cl.
CPC .............. *H04N 9/735* (2013.01); *G03B 13/02* (2013.01); *G03B 13/04* (2013.01); *G03B 17/20* (2013.01);
(Continued)

(58) Field of Classification Search
CPC .............. H04N 9/735; H04N 5/232939; H04N 5/232945; H04N 5/232933;
(Continued)

(56) References Cited

U.S. PATENT DOCUMENTS

2005/0128316 A1* 6/2005 Sugimori ............. H04N 1/6011
348/223.1
2006/0146065 A1* 7/2006 Wada ....................... H04N 9/73
345/590
(Continued)

FOREIGN PATENT DOCUMENTS

CN     104469134 A    3/2015
CN     104581099 A    4/2015
(Continued)

OTHER PUBLICATIONS

International Preliminary Report on Patentability and Written Opinion of the International Searching Authority (Forms PCT/IB/326, PCT/IB/373 and PCT/ISA/237) for Application No. PCT/JP2016/083781, dated May 31, 2018, with an English translation of the Written Opinion.
(Continued)

*Primary Examiner* — Gevell V Selby
(74) *Attorney, Agent, or Firm* — Birch, Stewart, Kolasch & Birch, LLP

(57) ABSTRACT

An imaging element captures an optical image incident through an imaging lens. A finder device is configured to be capable of observing the optical image. An EVFLCD displays information to be observable in a state of being overlapped on or being close to the optical image, in the finder device. An EVF display controller controls the EVFLCD so that target color temperature information indicating a color temperature that is a target of color temperature adjustment and image color temperature information indicating a color temperature of the captured image are displayed as the information. A color temperature adjustment unit adjusts the color temperature of the captured image obtained by capturing the optical image using the imaging element based on a color temperature adjustment operation. In a case where the color temperature adjustment
(Continued)

operation is performed, the image color temperature information is changed in accordance with an adjustment operation amount.

10 Claims, 9 Drawing Sheets

(51) Int. Cl.
    *G03B 13/02* (2006.01)
    *H04N 5/232* (2006.01)
    *G03B 13/04* (2006.01)
    *H04N 5/225* (2006.01)

(52) U.S. Cl.
    CPC ..... *H04N 5/23216* (2013.01); *H04N 5/23245* (2013.01); *H04N 5/23293* (2013.01); *H04N 5/232933* (2018.08); *H04N 5/232939* (2018.08); *H04N 5/232945* (2018.08); *H04N 5/225* (2013.01)

(58) Field of Classification Search
    CPC .......... H04N 5/23245; H04N 5/23216; H04N 5/23293; H04N 5/225; G03B 13/04; G03B 17/20; G03B 13/02
    See application file for complete search history.

(56) References Cited

U.S. PATENT DOCUMENTS

| | | | |
|---|---|---|---|
| 2013/0113957 A1* | 5/2013 | Hamada | H04N 5/2351 348/223.1 |
| 2014/0168463 A1 | 6/2014 | Tamura | |
| 2015/0124131 A1 | 5/2015 | Misawa | |
| 2016/0071289 A1* | 3/2016 | Kobayashi | G06T 5/50 382/167 |

FOREIGN PATENT DOCUMENTS

| | | |
|---|---|---|
| CN | 105049699 A | 11/2015 |
| JP | 2005-64630 A | 3/2005 |
| JP | 2007-116589 A | 5/2007 |
| JP | 2014-110607 A | 6/2014 |
| WO | WO 2014/013796 A1 | 1/2014 |

OTHER PUBLICATIONS

International Search Report and English translation (Form PCT/ISA/210) for Application No. PCT/JP2016/083781, dated Dec. 27, 2016.

Office Action dated Dec. 18, 2019 in corresponding Chinese Application No. 201680067523.5.

* cited by examiner

IMAGING APPARATUS AND CONTROL METHOD THEREOF

CROSS-REFERENCE TO RELATED APPLICATIONS

This application is a Continuation of PCT International Application No. PCT/JP2016/083781 filed on 15 Nov. 2016, which claims priority under 35 U.S.C § 119(a) to Japanese Patent Application No. 2015-225961 filed on 18 Nov. 2015. The above application is hereby expressly incorporated by reference, in its entirety, into the present application.

BACKGROUND OF THE INVENTION

1. Field of the Invention

The present invention relates to an imaging apparatus having a hybrid viewfinder and a control method thereof.

2. Description of the Related Art

In recent years, an imaging apparatus such as a digital camera having a hybrid viewfinder has been known (see WO2014/013796A (corresponding to US2015/124131A1) and JP2014-110607A). The hybrid viewfinder is a viewfinder that is able to display, in a finder unit, one or both of an optical image of a subject and a captured image of the subject obtained by imaging the optical image using an imaging element. Particularly, the hybrid viewfinder enables the captured image to be overlapped on or be close to the optical image for display. Using such a hybrid viewfinder, it is possible for a user to perform framing of a subject using an optical image while confirming an image obtained through imaging in advance.

In many cases, digital cameras have an auto white balance (AWB) adjustment function. The AWB adjustment function refers to a function for detecting a type of light source (sun, fluorescent light, incandescent light bulb, or the like) in imaging and autonomously adjusting a color temperature indicating a tint of an image so that a white subject is imaged to be white. However, in the AWB adjustment function, there is a case where the adjustment of the color temperature is inappropriately performed due to false detection of the type of light source, for example, depending on an imaging scene. For example, in an imaging scene having a lot of green, such as a forest, the type of light source should be detected as the "sun", but may be mistakenly detected as a "fluorescent light".

In consideration of such a situation, in an imaging apparatus disclosed in JP2014-110607A, in a hybrid viewfinder mode, a user may manually adjust a color temperature of a captured image while comparing a tint of an optical image with a tint of the captured image.

SUMMARY OF THE INVENTION

However, as in the imaging apparatus disclosed in JP2014-110607A, in a case where a user targets a color of an optical image to adjust a color temperature of a captured image in the hybrid viewfinder mode, even in a case where the targeted color of the optical image slightly deviates from a real ideal color, the user may mistakenly recognize that the targeted color is the ideal color without recognizing the color deviation. This is because a human unconsciously corrects a tint in the brain.

For example, under a reddish light source (with a low color temperature) such as an incandescent light bulb, a white sheet shows a slightly yellowish color, but a user may mistakenly recognize that the color is an ideal white color. In this way, in the imaging apparatus disclosed in JP2014-110607A, even in a case where a color of an optical image that is a target deviates from an ideal color, the color that deviates from the ideal color may be a targeted color due to false recognition by a user, so that a color temperature of a captured image may be adjusted. As a result, the adjustment of the color temperature of the captured image may not be performed with high accuracy.

Accordingly, in the imaging apparatus disclosed in JP2014-110607A, as a result of the configuration that the optical image is targeted for the adjustment of the color temperature, there is a problem in that the adjustment of the color temperature of the image is not performed with high accuracy due to a difference in the type of light source or the like, and a variation occurs in a tint of an image obtained through imaging. This problem occurs irrespective of the presence or absence of the AWB adjustment function.

An object of the invention is to provide an imaging apparatus and a control method thereof capable of adjusting a color temperature of an image with high accuracy.

In order to achieve the above object, according to an aspect of the invention, there is provided an imaging apparatus comprising: an imaging element, a finder unit, an in-finder information display unit, a color temperature adjustment unit, target color temperature information, and a display controller. The imaging element generates an image based on an optical image that is incident through an imaging lens. The finder unit is configured to be capable of observing the optical image. The in-finder information display unit is provided to display information to be observable in a state of being overlapped on or being close to the optical image inside the finder unit. The color temperature adjustment unit adjusts a color temperature of the image based on a color temperature adjustment operation. The target color temperature information indicates a color temperature that is a target of the adjustment of the color temperature as the information by controlling the in-finder information display unit. The display controller displays image color temperature information indicating the color temperature of the image. The display controller controls the in-finder information display unit so that a first area and a second area are set to be adjacent to each other, a color of the color temperature indicated by the image color temperature information is displayed in the first area, and a color of the color temperature indicated by the target color temperature information is displayed in the second area.

It is preferable that the display controller displays the image color temperature information of the image after the color temperature is adjusted by the color temperature adjustment unit in a case where the color temperature adjustment operation is performed.

It is preferable that the imaging apparatus further comprises: an image storage unit; a first region designation unit that designates a first designation region in a stored image stored in the image storage unit; and a first color temperature acquisition unit that acquires a color temperature of the first designation region designated by the first region designation unit, in which the target color temperature information indicates the color temperature of the first designation region acquired by the first color temperature acquisition unit.

It is preferable that the stored image is an image obtained by imaging.

The stored image may be a color chart in which colors of different color temperatures are arranged.

It is preferable that the first designation region is displayed to be identifiable with respect to the color chart.

It is preferable that the first color temperature acquisition unit calculates an average color temperature in the first designation region.

It is preferable that the imaging apparatus further comprises: a second region designation unit that designates a second designation region in the optical image observed in the finder unit; and a second color temperature acquisition unit that acquires the color temperature of the image corresponding to the second designation region designated by the second region designation unit, in which the image color temperature information indicates the color temperature of the image corresponding to the second designation region.

It is preferable that the second color temperature acquisition unit calculates an average color temperature in the second designation region.

It is preferable that the imaging apparatus further comprises: a color temperature difference calculation unit that calculates a color temperature difference between the color temperature of the first designation region and the color temperature of the second designation region, in which the display controller displays color temperature difference information indicating the color temperature difference, in addition to the target color temperature information and the image color temperature information, as the information.

It is preferable that the imaging apparatus further comprises: a light shielding unit configured to be capable of partially shielding the optical image in the finder unit, in which the in-finder information display unit sets the first area and the second area in portions that are partially shielded by the light shielding unit for the information.

According to another aspect of the invention, there is provided a control method of an imaging apparatus that includes an imaging element that generates an image based on an optical image that is incident through an imaging lens, a finder unit configured to be capable of observing the optical image, an in-finder information display unit on which information is displayed to be observable in a state of being overlapped on or being close to the optical image inside the finder unit, and a color temperature adjustment unit that adjusts a color temperature of the image based on a color temperature adjustment operation, the method comprising: a display controller controlling the in-finder information display unit so that target color temperature information indicating a color temperature that is a target of the adjustment of the color temperature and image color temperature information indicating the color temperature of the image are displayed as the information, and so that a first area and a second area are set to be adjacent to each other, a color of the color temperature indicated by the image color temperature information is displayed in the first area, and a color of the color temperature indicated by the target color temperature information is displayed in the second area.

According to the imaging apparatus and the control method thereof of the invention, since target color temperature information indicating a color temperature that is a target for adjustment of a color temperature and image color temperature information indicating a color temperature of an image are displayed to be observable in a state of being overlapped on or close to an optical image, it is possible to adjust the color temperature of the image with high accuracy.

DESCRIPTION OF THE PREFERRED EMBODIMENTS

First Embodiment

Figure 1:
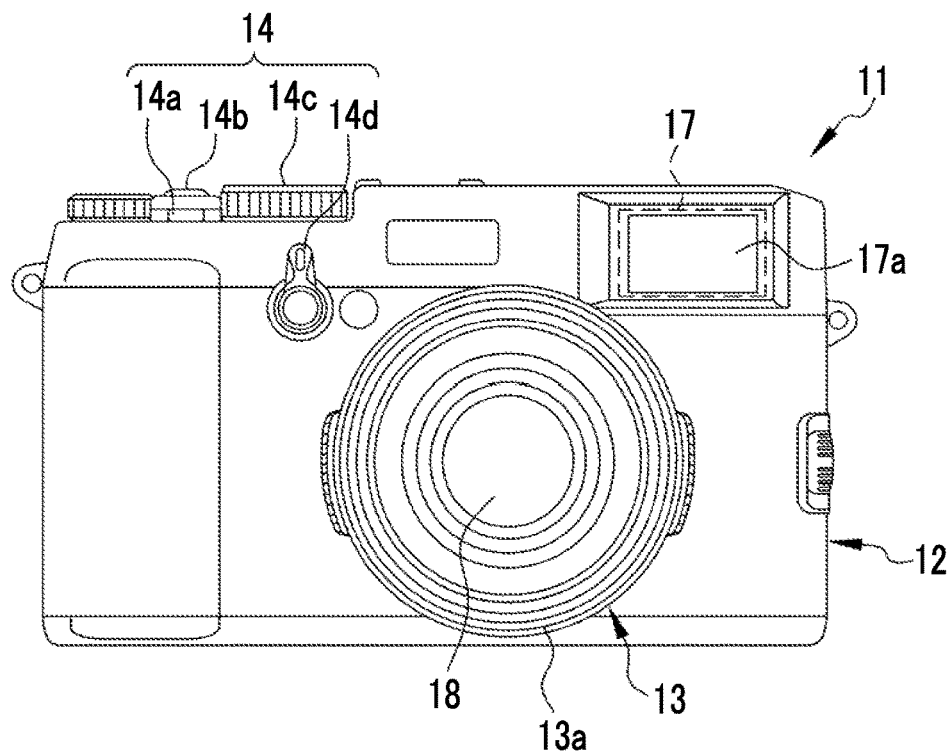
FIG. 1 is a front view of a digital camera.
Figure 2:
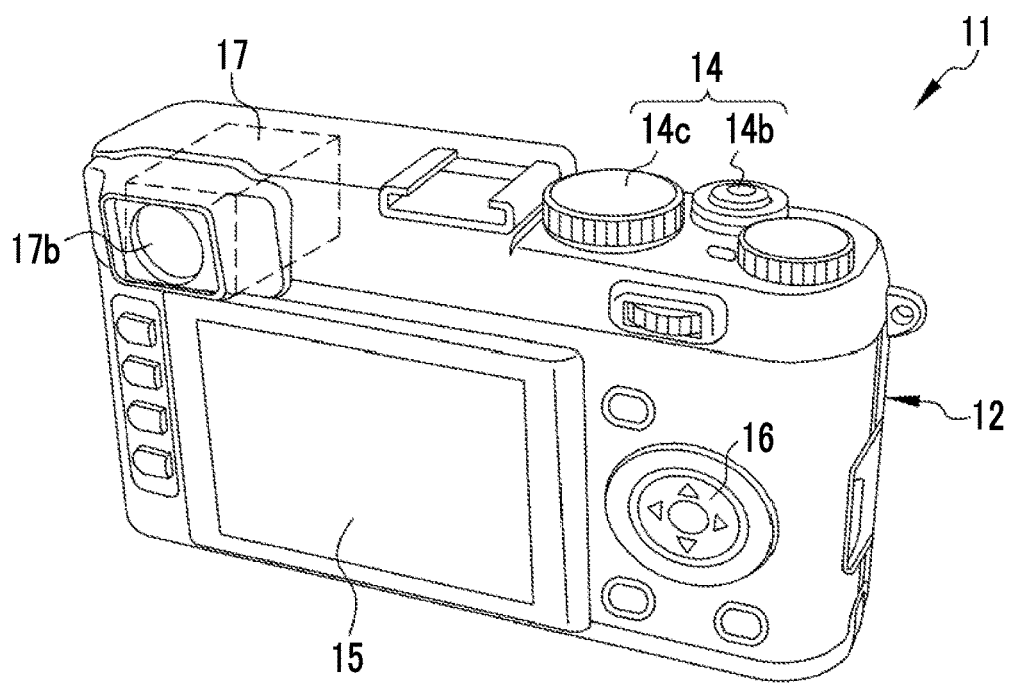
FIG. 2 is a rear side perspective view of the digital camera.

In FIG. 1 and FIG. 2, a digital camera 11 that is an imaging apparatus includes a camera body 12, a lens barrel 13, an upper surface operating unit 14, a rear surface display unit 15, a rear surface operating unit 16, and a finder device (finder unit) 17.

The finder device 17 is able to perform mode switching between an optical viewfinder (OVF) mode (hereinafter, referred to as an OVF mode), an electronic viewfinder (EVF) mode (hereinafter, referred to as an EVF mode), and a hybrid viewfinder (HVF) mode (hereinafter, referred to as an HVF mode).

In the OVF mode, an OVF image in which an optical image of a subject and an information image indicating electronic information on an imaging condition or the like overlap each other is observable. In the EVF mode, a captured image obtained by capturing an optical image and the information image are observable. In the HVF mode, both of the optical image and the captured image are observable.

The OVF mode includes a color temperature adjustment mode in which a user can manually adjust a color temperature of a captured image. In the color temperature adjustment mode, as electronic information, image color temperature information indicating a color temperature of a captured image and target color temperature information indicating a color temperature that is an adjustment target of the color temperature are displayed.

Further, in the digital camera 11, a target color temperature information setting mode in which a user can set target color temperature information is provided. The target color temperature information setting mode refers to a mode in which an ideal reference color of a captured image that a user wants to obtain through imaging is registered in advance, before the imaging. Switching to the color temperature adjustment mode or the target color temperature information setting mode is performed by an operation of the upper surface operating unit 14, and is executed by a main controller 32 (which will be described later).

The lens barrel 13 is provided on a front surface of the camera body 12 to hold an imaging lens 18. In the lens barrel 13, a control ring 13a is provided. The control ring 13a is attached to the lens barrel 13 to be rotatable around a light axis of the imaging lens 18. The control ring 13a is used for various operations such as setting switching, and is used for a color temperature adjustment operation by a user in the color temperature adjustment mode.

The amount of rotation of the control ring 13a corresponds to an adjustment operation amount of a color temperature (color temperature shift amount). The main controller 32 (which will be described later) detects a rotational position of the control ring 13a through a position sensor (not shown), and calculates the amount of rotation from a reference position. A color temperature adjustment unit 74 (which will be described later) calculates a color temperature shift amount corresponding to the amount of rotation calculated by the main controller 32.

The upper surface operating unit 14 is provided on an upper surface of the camera body 12, and includes a power button 14a, a release button 14b, a mode switch dial 14c, a finder switch lever 14d, and the like. The power button 14a is operated in turning on or off a power source (not shown) of the digital camera 11. The release button 14b is operated in executing imaging. The mode switch dial 14c is operated in switching an operation mode between an imaging mode, an image reproduction mode, a setting mode, and the like. The mode switch dial 14c is also used in a setting operation of the color temperature adjustment mode and the target color temperature information setting mode. The finder switch lever 14d is operated in switching a mode of the finder device 17 between the OVF mode, EVF mode, and the HVF mode.

The imaging mode includes a static image capturing mode for acquiring a static image and a motion picture capturing mode for acquiring a motion picture. In the image reproduction mode, an image acquired in the static image capturing mode or the motion picture capturing mode is reproduced and displayed on the rear surface display unit 15.

The release button 14b has a two-stage stroke type switch (not shown) configured by a switch S1 and a switch S2. In a case where the release button 14b is pressed (half-pressed) and the switch S1 is turned on, the digital camera 11 performs an imaging preparation operation such as an autofocus (AF) operation. In a case where the release button 14b is pressed (fully pressed) from this state and the switch S2 is turned on, the digital camera 11 performs an imaging operation.

The rear surface display unit 15 is provided on a rear surface of the camera body 12 and displays a captured image acquired in a variety of imaging modes, a menu screen for performing various settings, or the like. The rear surface display unit 15 may be a touchscreen in which a display device such as a liquid crystal display (LCD) and an input device such as a touchpad are combined. In this case, various settings may be performed through a touch operation with respect to the touchscreen.

The rear surface operating unit 16 is provided on the rear surface of the camera body 12. The rear surface operating unit 16 is used in a case where a user sets target color temperature information in the target color temperature information setting mode, in addition to various setting operations.

The finder device 17 has a finder window 17a that imports an optical image of a subject and a finder eyepiece unit 17b for the eyes of a user. The finder window 17a is provided on a front surface side of the camera body 12. The finder eyepiece unit 17b is provided on a rear surface side of the camera body 12.

Further, in a bottom of the camera body 12, a slot (not shown) for mounting of a recording medium 41 (which will be described later) (see FIG. 3) is provided.

Figure 3:
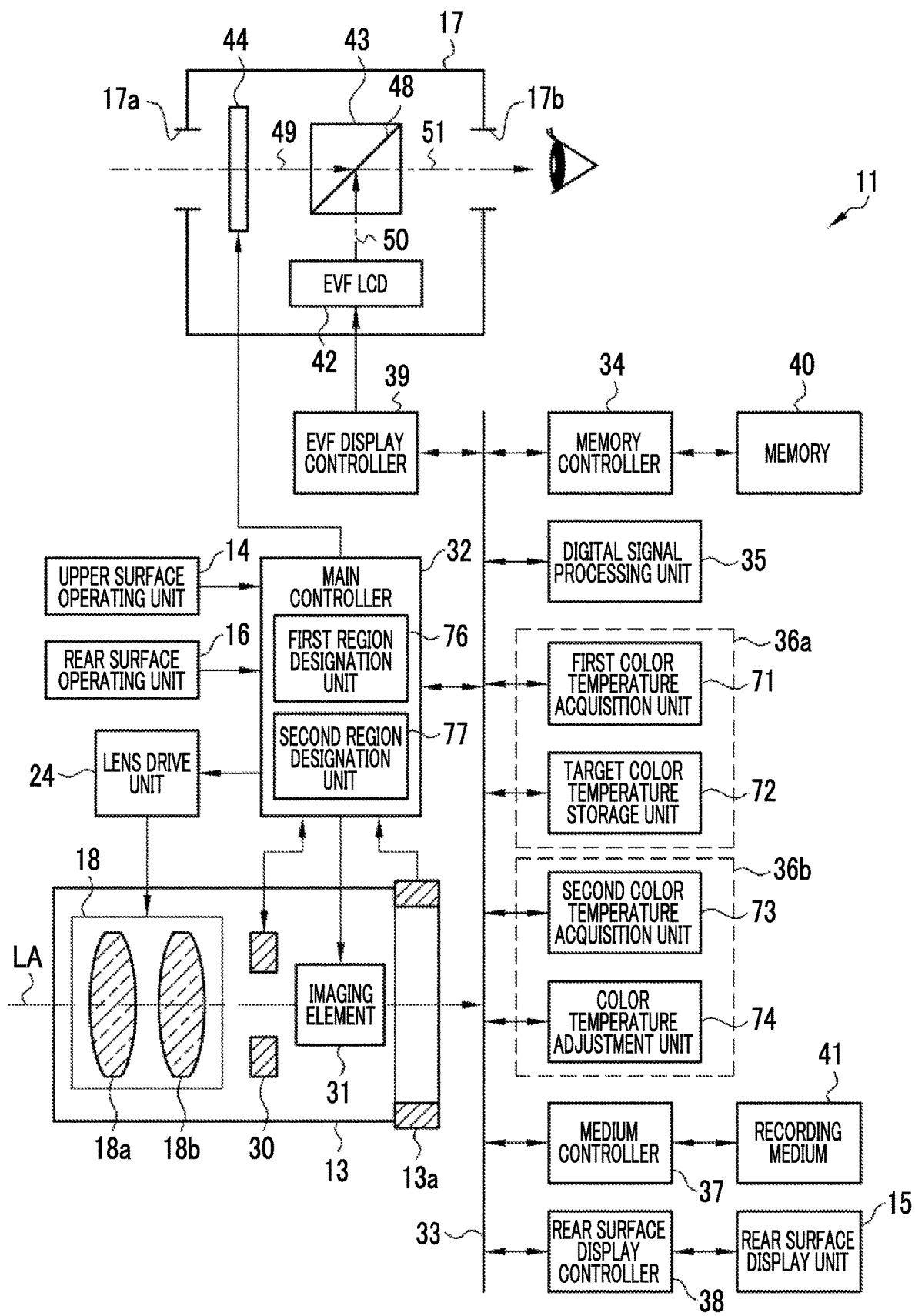
FIG. 3 is a block diagram showing an electric configuration of the digital camera.

In FIG. 3, in the lens barrel 13, a stop 30 and an imaging element 31 are provided along a light axis LA of the imaging lens 18. The stop 30 is drive-controlled by the main controller 32, and adjusts the quantity of light to be incident onto the imaging element 31. An optical image of a subject of which the quantity of light is adjusted by the stop 30 after passing through the imaging lens 18 is incident onto the imaging element 31. The imaging element 31 may be disposed outside the lens barrel 13.

The imaging lens 18 includes a zoom lens 18a and a focus lens 18b. The lens drive unit 24 is connected to the imaging lens 18. The lens drive unit 24 moves the zoom lens 18a and the focus lens 18b in a light axis direction under the control of the main controller 32. Zooming is performed by driving of the zoom lens 18a, and an AF operation is performed by driving of the focus lens 18b.

The imaging element 31 is a complementary metal oxide semiconductor (CMOS) type image sensor of a single-plate color imaging method having RGB color filters, for example. The imaging element 31 has a light receiving surface configured of a plurality of pixels (not shown) arranged in a two-dimensional matrix form. Each pixel includes a photoelectric conversion element, and captures an optical image formed on the light receiving surface through photoelectric conversion to generate an imaging signal. Further, the imaging element 31 has an electronic shutter function, and is capable of adjusting a shutter speed (electric charge accumulation time).

The imaging element 31 includes signal processing circuits. As the signal processing circuits, a noise rejection circuit, an auto gain controller, an analog/digital (A/D) conversion circuit, and the like are provided (all of them are not shown). The noise rejection circuit performs a noise rejection process with respect to an imaging signal. The auto gain controller amplifies the level of the imaging signal to an optimal value. The A/D conversion circuit converts the imaging signal into a digital signal, and outputs the digital signal from the imaging element 31. The output signal from the imaging element 31 is image data (so-called RAW data) of an RGB format having one color signal for each pixel.

The imaging element 31 and the main controller 32 are connected to a bus 33. In addition, a memory controller 34, a digital signal processing unit 35, a target color temperature setting processing unit 36a, a color temperature adjustment processing unit 36b, a medium controller 37, a rear surface display controller 38, and an EVF display controller (display controller) 39 are connected to the bus 33.

A memory 40 for temporary storage such as a synchronous dynamic random access memory (SDRAM) is connected to the memory controller 34. The memory controller 34 inputs the image data of the RGB format output from the imaging element 31 to the memory 40 for storage. Further, the memory controller 34 outputs the image data of the RGB format stored in the memory 40 to the digital signal processing unit 35.

The digital signal processing unit 35 performs a defect correction process, a demosaicing process, a gamma correction process, an RGB gain correction process, a YC conversion process, or the like with respect to the image data of the RGB format input from the memory controller 34, and generates image data (YC image data) of an YC format formed by a brightness signal Y and a color difference signal C. The digital signal processing unit 35 outputs the generated image data of the YC format to the memory controller 34 to be stored in the memory 40.

Further, the digital signal processing unit 35 performs a compression process based on a variety of imaging modes with respect to the YC image data to generate an image file. Specifically, in the case of the static image capturing mode, the digital signal processing unit 35 compresses the YC image data according to Joint Photographic Experts Group (JPEG) standards to generate compressed image data. In the case of the motion picture capturing mode, the digital signal processing unit 35 compresses pieces of YC image data of a plurality of frames obtained by motion picture imaging, for example, according to Moving Picture Experts Group (MPEG)-4 standards to generate motion picture data. The digital signal processing unit 35 outputs the generated image file to the medium controller 37.

The medium controller 37 controls recording and reading of an image file with respect to the recording medium 41 that is an image storage unit. The recording medium 41 is a memory card in which a flash memory or the like is included, for example. In the case of the static image capturing mode, the compressed image data generated by the digital signal processing unit 35 is recorded in the recording medium 41. Further, in the case of the motion picture capturing mode, motion picture data generated by the digital signal processing unit 35 is recorded on the recording medium 41. In the case of the motion picture capturing mode, sound in addition to an image may also be acquired and recorded, but in this embodiment, a configuration relating to acquisition and recording of the sound will not be described.

The target color temperature setting processing unit 36a includes a first color temperature acquisition unit 71 and a target color temperature storage unit 72. The color temperature adjustment processing unit 36b includes a second color temperature acquisition unit 73 and a color temperature adjustment unit 74. The target color temperature setting processing unit 36a is operated in the target color temperature information setting mode, and enables a user to set a target color temperature. The color temperature adjustment processing unit 36b is operated in the color temperature adjustment mode, and enables acquisition of a color temperature of a captured image and adjustment of the color temperature of the captured image based on an operation by a user.

The rear surface display controller 38 controls an image display on the rear surface display unit 15. Specifically, the rear surface display controller 38 generates a video signal according to National Television System Committee (NTSC) standards or the like based on YC image data generated by the digital signal processing unit 35, and outputs the video signal to the rear surface display unit 15.

The EVF display controller 39 generates a video signal based on the YC image data in a similar way to the rear surface display controller 38, and outputs the video signal to an EVFLCD 42 (which will be described later).

In the finder device 17, the EVFLCD 42 that is an in-finder information display unit, a prism 43, and an OVF shutter 44 that is a light shielding unit are provided.

The EVFLCD 42 displays various images acquired in various imaging modes. In the EVFLCD 42, an area where an image is displayed is set in accordance with a mode of the finder is set.

In the EVF mode, an image display area (not shown) in which a captured image obtained by capturing an optical image of a subject using the imaging element 31 is displayed and an information display area (not shown) in which an information image is displayed are set in the EVFLCD 42. The information display area is set in the vicinity of the image display area, for example, on a lower side thereof. The captured image refers to a display image of a YC image data generated by the digital signal processing unit 35. The information image refers to a display image of information image data generated by the main controller 32. The information image data is generated based on imaging information such as imaging conditions. The imaging conditions include a shutter speed, an F number, an ISO sensitivity, and the like. The imaging conditions may be set by an operation of the upper surface operating unit 14, for example.

In the OVF mode, an information display area is set in the EVFLCD 42. The information display area is set on a lower side, for example, in a similar to the EVF mode. In the OVF mode, the image display area in the EVF mode is not displayed.

In the HVF mode, a sub-display area (not shown) in which a captured image in addition to an information display area is displayed is set in the EVFLCD 42. The sub-display area is set to be adjacent to the information display area in a lower right portion of a screen, for example. In the HVF mode, the image display area in the EVF mode is not displayed.

Figure 4:
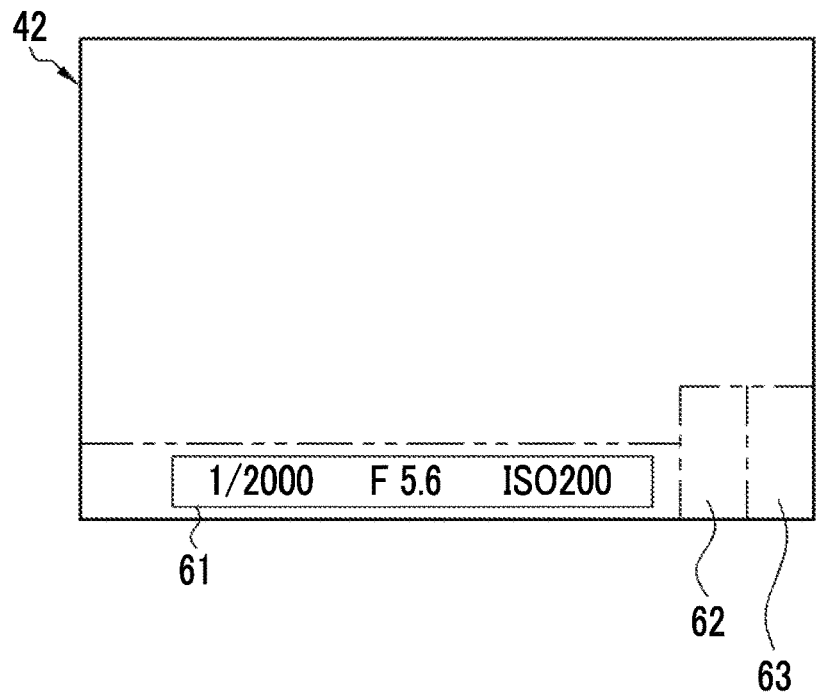
FIG. 4 is a diagram showing a display area of an EVFLCD in a color temperature adjustment mode.

In the color temperature adjustment mode that is one type of the OVF mode, as shown in FIG. 4, an information display area 61, an image color temperature information display area (a first area) 62, and a target color temperature information display area (a second area) 63 are set in the EVFLCD 42. Other areas (the image display area in the EVF mode) are not displayed. "1/2000" in the information display area 61 is a display example of a shutter speed, "ISO 200" is a display example of an ISO sensitivity, and "F5.6" is a display example of an F number.

In the image color temperature information display area 62, image color temperature information indicating a color temperature of a captured image is displayed. In this embodiment, in the image color temperature information display area 62, an image of a single color corresponding to the color temperature of the captured image is displayed as the image color temperature information. In the target color temperature information display area 63, target color temperature information indicating a color temperature that is a target of color temperature adjustment is displayed. In this embodiment, in the target color temperature information display area 63, an image of a single color corresponding a target color temperature is displayed as the target color temperature information. The image color temperature information display area 62 and the target color temperature information display area 63 are set to be adjacent to each other. For example, the image color temperature information display area 62 and the target color temperature information display area 63 are set to be adjacent to the information display area 61 in a lower right portion of a screen.

In FIG. 3, the prism 43 is configured so that a half mirror 48 that is an optical path integration unit is provided therein. The half mirror 48 is disposed to form an angle of 45° with respect to a first optical path 49 on which an optical image of a subject that is incident onto the finder window 17a is to propagate and a second optical path 50 on which a display image displayed on the EVFLCD 42 is to propagate. In the half mirror 48, the first optical path 49 and the second optical path 50 are integrated to form a third optical path 51. The finder eyepiece unit 17b is disposed on the third optical path 51.

The half mirror 48 partially transmits the optical image that propagates on the first optical path 49 to be guided to the third optical path 51, and partially reflects the display image that propagates on the second optical path 50 to be guided to the third optical path 51. Thus, the optical image and the display image are guided to the finder eyepiece unit 17b.

The OVF shutter 44 is a liquid crystal shutter, and is disposed on the first optical path 49. A light transmittance of the OVF shutter 44 is controlled to become a low transmittance (for example, 0%) or a high transmittance (for example, 100%) by the main controller 32. The OVF shutter 44 shields the optical image from light so as not to be incident onto the prism 43 in a low transmittance area, and transmits the optical image to be incident onto the prism 43 in a high transmittance area. The main controller 32 identifies the respective display areas of the EVFLCD 42, and entirely or partially changes the light transmittance of the OVF shutter 44 according to modes of the finder.

In the case of the EVF mode, the main controller 32 controls the OVF shutter 44 so that areas corresponding to an image display area and an information display area of the EVFLCD 42 are set to a low transmittance. In this case, the entirety of the OVF shutter 44 is set to a low transmittance. The low-transmittance OVF shutter 44 shields an optical image from light. A captured image is displayed in the image display area of the EVFLCD 42, and an information image is displayed in the information display area. Thus, in the EVF mode, the captured image and the information image are observable from the finder eyepiece unit 17b.

In the case of the OVF mode, the main controller 32 controls the OVF shutter 44 so that an area corresponding to an image display area of the EVFLCD 42 is set to a high transmittance and an area corresponding to an information display area thereof is set to a low transmittance. The OVF shutter 44 transmits an optical image in the area corresponding to the image display area, and does not transmit an optical image in the area corresponding to the information display area. The image display area of the EVFLCD 42 is not displayed, and the information image is displayed in the information display area. Thus, in the OVF mode, an OVF image in which the information image displayed on the EVFLCD 42 is overlapped on the optical image is observable from the finder eyepiece unit 17b.

In the case of the HVF mode, the main controller 32 controls the OVF shutter 44 so that an area corresponding to an image display area of the EVFLCD 42 is set to a high transmittance and areas corresponding to an information display area and a sub-display area are set to a low transmittance. The OVF shutter 44 transmits an optical image in an area corresponding to the image display area, and does not transmit the optical image in areas corresponding to the information display area and the sub-display area. The image display area of the EVFLCD 42 is not displayed, a captured image is displayed in the sub-display area, and an information image is displayed in the information display area. Thus, in the HVF mode, an HVF image in which a captured image and an information image are overlapped on an optical image is observable from the finder eyepiece unit 17b.

In the case of the color temperature adjustment mode, the main controller 32 controls the OVF shutter 44 so that an area corresponding to an image display area of the EVFLCD 42 is set to a high transmittance and areas corresponding to the information display area 61, the image color temperature information display area 62, and the target color temperature information display area 63 are set to a low transmittance. The OVF shutter 44 transmits an optical image in the area corresponding to the image display area, and does not transmit the optical image in the areas corresponding to the information display area 61, the image color temperature information display area 62, and the target color temperature information display area 63.

Figure 5:
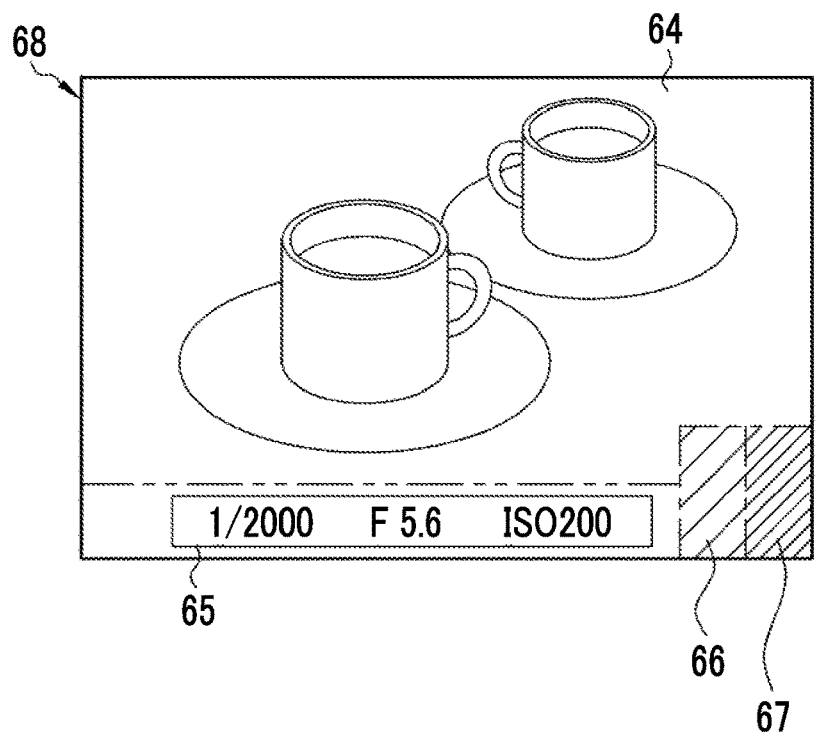
FIG. 5 is a diagram showing a finder observation image in the color temperature adjustment mode.

The image display area of the EVFLCD 42 is not displayed. Further, an information image is displayed in the information display area 61, image color temperature information is displayed in the image color temperature information display area 62, and target color temperature information is displayed in the target color temperature information display area 63. Thus, in the color temperature adjustment mode, as shown in FIG. 5, a finder observation image 68 in which an information image 65, image color temperature information 66, and target color temperature information 67 are overlapped on the optical image 64 is observable from the finder eyepiece unit 17b. The overlapping means partially shielding the optical image 64 and displaying an image or information in a shielded portion.

Next, details of the target color temperature setting processing unit 36a will be described. In the color temperature information setting mode, the first color temperature acquisition unit 71 acquires a target color temperature indicating a color temperature that is a target for color temperature adjustment. Specifically, in the color temperature information setting mode, under the control of the main controller 32, a previous image (stored image) stored in the recording medium 41 that is an image storage unit is displayed on the EVFLCD 42. In one previous image, a first designation region is designated. The first color temperature acquisition unit 71 calculates a color temperature of the first designation region in the previous image, and acquires the calculated color temperature as a target color temperature. The previous image refers to an image obtained through imaging, and may be stored in the memory 40 that is an internal memory, instead of the recording medium 41.

Further, specifically, the main controller 32 includes a first region designation unit 76, and is capable of designating the first designation region in one previous image based on an operation of the rear surface operating unit 16 from a user. The first color temperature acquisition unit 71 calculates an average color in the first designation region, and acquires a color temperature of the calculated average color as a target color temperature, for example. The average color corresponds to a ratio of respective average values of R signals, G signals, and B signals in the first designation region. The first designation region may be designated plural times by the first region designation unit 76. The first color temperature acquisition unit 71 acquires a target color temperature whenever the first designation region is designated.

The target color temperature storage unit 72 stores the target color temperature acquired by the first color temperature acquisition unit 71. In a case where a plurality of target color temperatures are acquired by the first color temperature acquisition unit 71, the target color temperature storage unit 72 stores the plurality of acquired target color temperatures.

Next, details of the color temperature adjustment processing unit 36b will be described. The second color temperature acquisition unit 73 acquires an image color temperature indicating a color temperature of a captured image in the color temperature adjustment mode. Specifically, in the color temperature adjustment mode, a second designation region is designated in a display area of an optical image. The second color temperature acquisition unit 73 calculates a color temperature of a region corresponding to the second designation region in the captured image, and acquires the calculated color temperature as an image color temperature.

Specifically, the main controller 32 includes a second region designation unit 77, and is capable of designating a second designation region in an optical image based on an operation of the rear surface operating unit 16 from a user. The second color temperature acquisition unit 73 calculates, for example, an average color of a region corresponding to the second designation region in YC image data generated by the digital signal processing unit 35, and acquires a color temperature of the calculated average color as an image color temperature. The second color temperature acquisition unit 73 outputs image color temperature information based on the acquired image color temperature to the main controller 32. A method for calculating the color temperature in the second color temperature acquisition unit 73 is the same as the above-described method in the first color temperature acquisition unit 71.

In a case where the image color temperature information is input from the second color temperature acquisition unit 73, the main controller 32 controls the EVF display controller 39 so that the image color temperature information is displayed in the image color temperature information display area 62 of the EVFLCD 42.

Further, the main controller 32 acquires a target color temperature from the target color temperature storage unit 72 based on the image color temperature information input from the second color temperature acquisition unit 73. Specifically, the main controller 32 selects and acquires a target color temperature that is close to the image color temperature input from the second color temperature acquisition unit 73 among a plurality of target color temperatures stored in the target color temperature storage unit 72. In addition, the main controller 32 controls the EVF display controller 39 so that target color temperature information based on the target color temperature is displayed in the target color temperature information display area 63 of the EVFLCD 42.

The color temperature adjustment unit 74 adjusts a color temperature of a captured image generated by the digital signal processing unit 35 based on a color temperature adjustment operation. Specifically, the color temperature adjustment unit 74 calculates an adjustment amount (shift amount) of the color temperature based on the amount of rotation of the control ring 13a detected by the main controller 32. The color temperature adjustment unit 74 outputs the shift amount of the calculated color temperature to the digital signal processing unit 35, so that color temperature adjustment based on the shift amount is executed with respect to the captured image. The digital signal processing unit 35 changes respective gain amounts with respect to an R signal, a G signal, and a B signal based on the shift amount input from the color temperature adjustment unit 74 in an RGB gain correction process. Thus, the color temperature of the captured image generated by the digital signal processing unit 35 is adjusted in accordance with the shift amount desired by a user. The main controller 32 controls the EVF display controller 39 so that the image color temperature information obtained from the captured image after the color temperature is adjusted is displayed in the image color temperature information display area 62.

Figure 6:
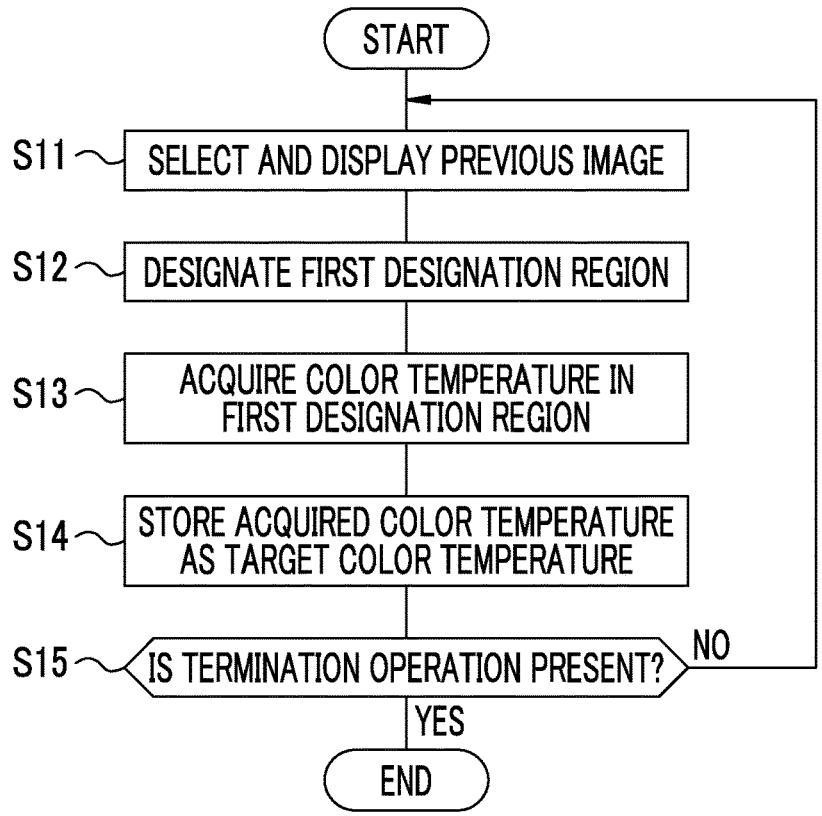
FIG. 6 is a flowchart illustrating a target color temperature information setting mode.

Next, the target color temperature information setting mode will be described with reference to FIGS. 6 to 8. In the target color temperature information setting mode, the main controller 32 displays a previous image stored in the recording medium 41 on the EVFLCD 42 based on an operation of the rear surface operating unit 16 from a user (S11). In a case where a plurality of previous images are stored in the recording medium 41, the main controller 32 displays the plurality of previous images on the EVFLCD 42 and displays one previous image selected based on an operation of the rear surface operating unit 16 from the user. A display format for displaying the plurality of previous images on the EVFLCD 42 may be a list display such as thumbnails, or may be a display format for exchanging images one by one based on an input operation of the rear surface operating unit 16 from the user.

The first region designation unit 76 designates the first designation region in one previous image displayed on the EVFLCD 42 based on an operation of the rear surface operating unit 16 from the user (S12). The first color temperature acquisition unit 71 acquires a color temperature of the first designation region as a target color temperature (S13). For example, as shown in FIG. 7, a previous image 69 obtained by imaging an indoor scene is displayed on the EVFLCD 42, and a first designation region 78 is designated in accordance with a white cup disposed on a table. In this case, the target color temperature acquired by the first color temperature acquisition unit 71 is, for example, 5000 K (Kelvin).

The target color temperature storage unit 72 stores the target color temperature acquired by the first color temperature acquisition unit 71 (S14). In a case where a color temperature of the first designation region 78 acquired by the first color temperature acquisition unit 71 is 5000 K as described above, the target color temperature storage unit 72 stores 5000 K as a target color temperature "K1", as shown in FIG. 8. A correspondence relationship between a color temperature and a color is as shown in the figure. 5000 K corresponds to an approximately pure white color. Further, as the color temperature becomes higher, blueness becomes stronger, and as the color temperature becomes lower, redness becomes stronger.

In a case where a termination operation of the target color temperature information setting mode is performed, the main controller 32 terminates the target color temperature information setting mode (YES in S15). On the other hand, in a case where the termination operation of the target color temperature information setting mode is not performed (NO in S15), a previous image is selected and displayed under the control of the main controller 32 (S11), and thus, a plurality of target color temperatures may be stored in the target color temperature storage unit 72.

Figure 7:
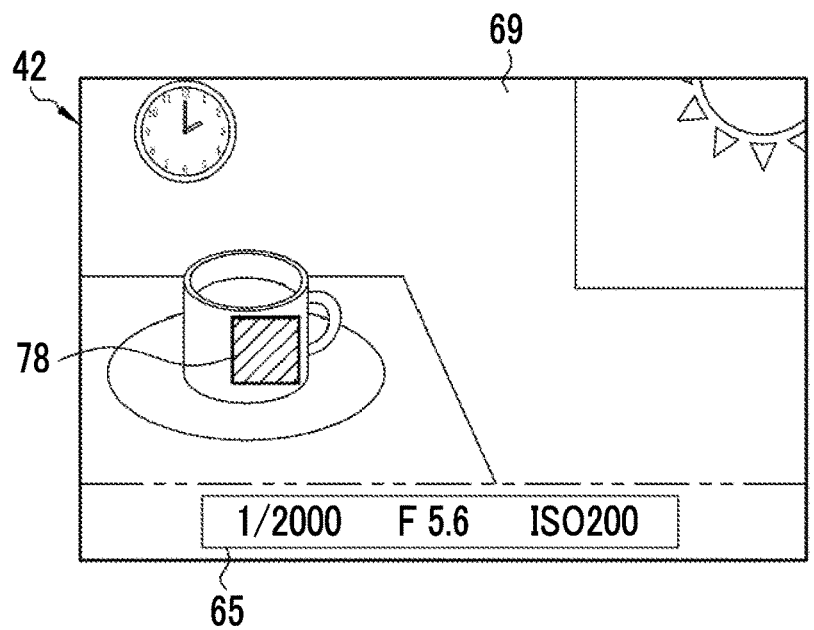
FIG. 7 is a diagram illustrating a first designation region designated in a previous image.
Figure 8:
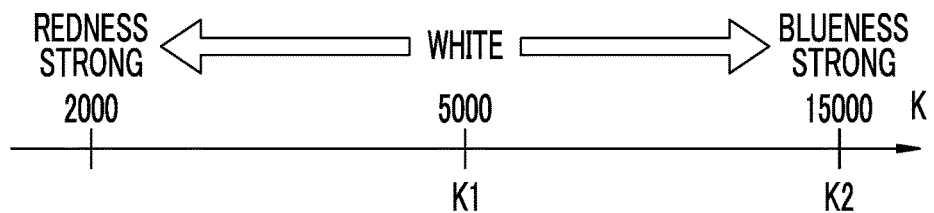
FIG. 8 is a diagram illustrating a target color temperature stored in a target color temperature storage unit.

For example, in addition to the white cup shown in FIG. 7, the first designation region may be designated in accordance with a blue sky outside a window (S12). In this case, a color temperature acquired by the first color temperature acquisition unit 71 is, for example, 15000 K. The target color temperature storage unit 72 stores 15000 K acquired by the first color temperature acquisition unit 71 as a target color temperature "K2" (see FIG. 8). Thus, the target color temperature "K2" is stored in the target color temperature storage unit 72 in addition to the target color temperature "K1".

The user may register in advance an ideal reference color of a captured image that the user wants to obtain through imaging as a target color temperature from previously captured images, before the imaging, by the target color temperature information setting mode.

Figure 10:
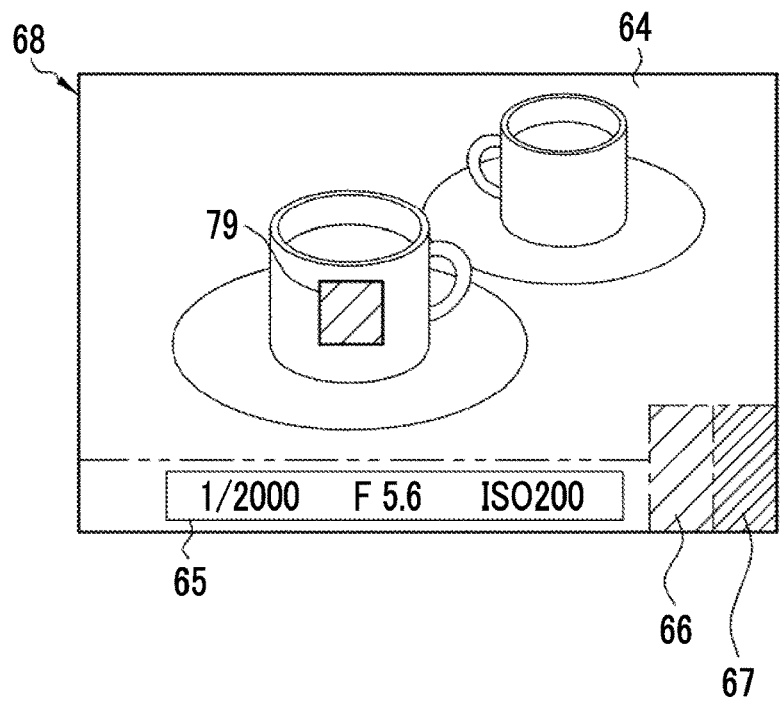
FIG. 10 is a diagram illustrating a second designation region designated in the finder observation image.
Figure 11:
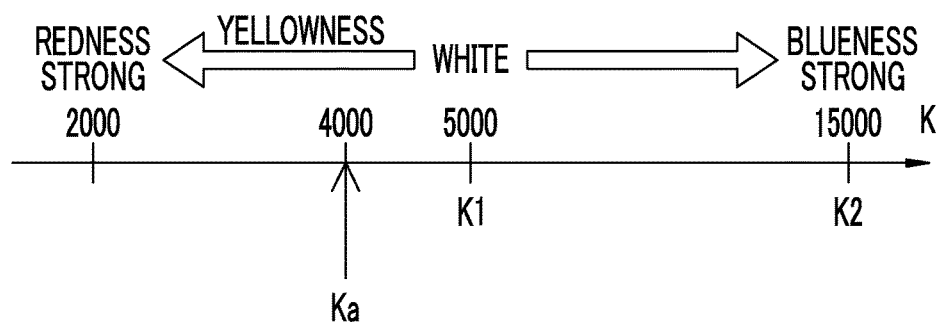
FIG. 11 is a diagram illustrating a target color temperature acquisition method.

Next, the color temperature adjustment mode will be described with reference to FIGS. 9 to 11. In the color temperature adjustment mode, an optical image of a subject is captured by the imaging element 31, and the digital signal processing unit 35 performs various processes with respect to image data obtained through the imaging, so that a captured image is acquired (S21).

In a case where the second region designation unit 77 designates the second designation region in a display area of the optical image based on an operation of the rear surface operating unit 16 from a user, the second color temperature acquisition unit 73 acquires a color temperature of a region corresponding to the second designation region in the acquired captured image as an image color temperature (S22). For example, as shown in FIG. 10, in an imaging scene for imaging an indoor scene, a second designation region 79 is designated in accordance with a white cup of the optical image 64 based on an operation of the rear surface operating unit 16. In this case, an image color temperature acquired by the second color temperature acquisition unit 73 is, for example, 4000 K.

The main controller 32 confirms a correspondence relationship a color temperature and a color, calculates a color corresponding to the image color temperature acquired by the second color temperature acquisition unit 73 based on the correspondence relationship, and displays the calculated color in the image color temperature information display area 62 of the EVFLCD 42 (S23). In a case where the image color temperature is "4000 K" as described above, an approximately yellowish white color is displayed in the image color temperature information display area 62.

Further, the main controller 32 acquires a target color temperature from the target color temperature storage unit 72 based on the image color temperature acquired by the second color temperature acquisition unit 73 (S24). For example, as shown in FIG. 11, in a case where two target color temperatures K1 and K2 are stored in the target color temperature storage unit 72, the main controller 32 selects and acquires the target color temperature K1 having a smaller difference with an image color temperature Ka acquired by the second color temperature acquisition unit 73.

The main controller 32 calculates a color corresponding to the acquired target color temperature K1, and displays the calculated color in the target color temperature information display area 63 of the EVFLCD 42 (S25). In a case where the target color temperature K1 is "5000 K" as described above, an approximately pure white color is displayed in the target color temperature information display area 63.

The user compares the color displayed in the image color temperature information display area 62 with the color displayed in the target color temperature information display area 63, and performs a color temperature adjustment operation using the control ring 13a so that the display color of the image color temperature information display area 62 is close to the display color of the target color temperature information display area 63, to adjust the color temperature of the captured image.

The main controller 32 detects an adjustment operation amount of a color temperature from the user, that is, the amount of rotation of the control ring 13a (S26). The color temperature adjustment unit 74 calculates a shift amount of the color temperature corresponding to the amount of rotation acquired by the main controller 32. The color temperature adjustment unit 74 outputs the calculated shift amount to the digital signal processing unit 35 for setting (S27). Thus, in the next imaging period, color temperature adjustment based on the shift amount is executed by the digital signal processing unit 35 with respect to the captured image acquired in step S22.

Steps S21 to S27 are repeatedly executed until the user presses the release button 14b to execute an imaging operation (YES in S28). Thus, the display color of the image color temperature information display area 62 is changed in conjunction with the adjustment operation of the color temperature from the user.

The user compares the display color of the image color temperature information display area 62 with the display color of the target color temperature information display area 63. Then, the user executes an imaging operation when both of the display colors approximately match each other. In a case where the imaging operation is performed (YES in S28), imaging is executed (S29). The captured image for which the adjustment of the color temperature has been performed through the digital signal processing unit 35 is recorded in the recording medium 41.

An operation of the digital camera 11 configured as described above will be described. In a case where the power button 14a is operated by a user and the static image capturing mode is selected as an operation mode, the digital camera 11 repeats imaging for an optical image to periodically acquire a captured image. In the static image capturing mode, the finder mode may be selectable. In a case where the finder mode is set to the color temperature adjustment mode that is a kind of the OVF mode, the user may adjust a color temperature of the captured image using the control ring 13a.

In the color temperature adjustment mode, in a case where the second designation region is designated by the user in a display area of an optical image, a color of an image color temperature corresponding to the second designation region in the captured image is displayed in the image color temperature information display area 62. Further, a color of a target color temperature that is set in advance in the target color temperature information setting mode is displayed in the target color temperature information display area 63.

In a case where the user wants to make the color of the captured image fit the color of the optical image using the color of the optical image as a target, even though the targeted color of the optical image slightly deviates from a real ideal color, the user unconsciously performs color correction within the brain, mistakenly recognizes that the color of the optical image is an ideal color, and tries to make the color of the captured image fit the mistakenly recognized ideal color. However, in this embodiment, since the color of the image color temperature indicating the color of the captured image is displayed in the image color temperature information display area 62 and the color of the target color temperature that is set in advance in the target color temperature information setting mode is displayed in the target color temperature information display area 63 that is adjacent to the image color temperature information display area 62, it is possible to make the color of the captured image close to the ideal color with high accuracy.

In the first embodiment, the first designation region is designated in a previous image acquired through previous imaging to acquire target color temperature information, but a target image for acquiring a target color temperature is not limited to the previous image that is previously captured by the digital camera 11. For example, an image that is present in a database or the like on the Internet may be imported into the recording medium 41, and/or may be imported into the digital camera 11 through a wired or wireless communication unit (not shown), and then, the imported image may be used as the target image.

Further, the target image may be a captured image obtained before the release button 14b is pressed. In this case, in the EVF mode or the HVF mode, the captured image is displayed as a live view image, and target color temperature information is acquired from the first designation region designated in the live view image.

Second Embodiment

Figure 12:
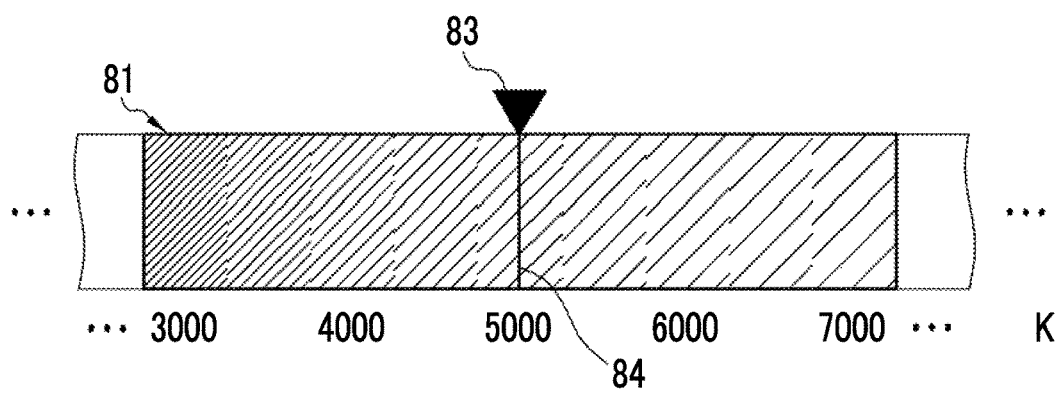
FIG. 12 is a diagram showing a color chart.

As a second embodiment, an example in which a target color temperature is acquired using a color chart in which colors having different color temperatures are arranged as a target image, instead of a previous image will be described. In this embodiment, a color chart 81 shown in FIG. 12 is stored in advance in the memory 40 that is an image storage unit. In the color chart 81, colors having different color temperatures are sequentially arranged in accordance with the color temperatures.

In the color temperature information setting mode, the main controller 32 displays the color chart 81 in the EVFLCD 42. In this embodiment, only a partial range in an entire region of the color chart 81 is displayed. In FIG. 12, only a range of 3000 K to 7000 K is displayed. The display range of the color chart 81 may be changeable based on an operation of the rear surface operating unit 16.

An indicator 83 is displayed to be adjacent to an upper side of the color chart 81. A linear region 84 indicated by the indicator 83 corresponds to the first designation region of the first embodiment. In this way, the first designation region is displayed to be identifiable with respect to the color chart 81. A user may operate the rear surface operating unit 16 to change the display range of the color chart 81, to thereby change the first designation region. The user operates the rear surface operating unit 16 to designate and determine a desired first designation region in the color chart 81. Thus, a color temperature of the first designation region is acquired as a target color temperature by the first color temperature acquisition unit 71.

Further, in the respective embodiments, in the color temperature information setting mode, a user performs a selection operation of the first designation region so that a target color temperature can be registered in the target color temperature storage unit 72, but a predetermined target color temperature may be set in advance (preset) in the target color temperature storage unit 72. Further, the user may perform an editing operation such as deletion or change of the target color temperature registered in the target color temperature storage unit 72. In addition, it is also preferable that a setting operation of the target color temperature may be executed for each of various imaging scenes.

Third Embodiment

In the first embodiment, the designation of the first designation region is performed in a previous image based on an operation of the rear surface operating unit 16 from a user, but the designation of the first designation region may be automated. In a third embodiment, a user automatically performs the designation of the first designation region from a previous image in accordance with a target color.

The main controller 32 displays a select screen for selecting any one color from a plurality of colors such as white, red, and blue on the EVFLCD 42. The user may set the target color by an operation of the rear surface operating unit 16.

The first region designation unit 76 extracts a region similar to a color set by the main controller 32 from a previous image 69 and sets the extracted region as the first designation region. For example, in a case where white is set as a target, the first region designation unit 76 extracts pixels including a pixel value close to white from the previous image 69. The first region designation unit 76 sets a region where the extracted pixels are densely crowded as the first designation region.

Figure 13:
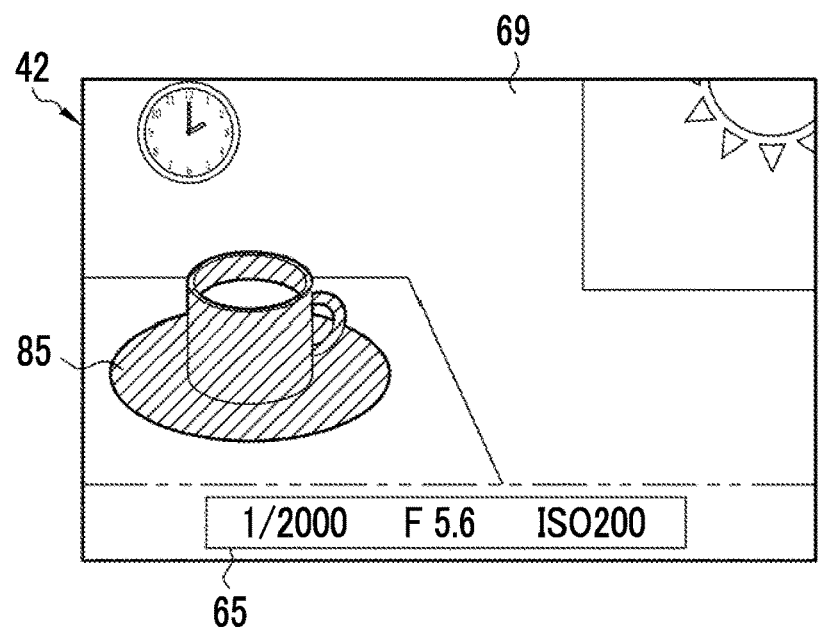
FIG. 13 is a diagram illustrating the first designation region that is autonomously designated by a first region designation unit.

For example, as shown in FIG. 13, in the previous image 69 obtained by imaging an indoor scene, the first region designation unit 76 extracts a region corresponding to a white cup and sets the extracted region as a first designation region 85. The first color temperature acquisition unit 71 acquires a color temperature of an average color of the first designation region 85 as a target color temperature.

The main controller 32 highlights the region extracted by the first region designation unit 76 using blinking or the like, to thereby cause the user to recognize which region is designated as the first designation region.

In a case where a plurality of regions similar to the color set by the main controller 32 are scattered, the first region designation unit 76 sets a region having the largest area among the plurality of regions as the first designation region. Further, in a case where the plurality of regions similar to the color set by the main controller 32 are scattered, the user may select which region is to be set as the first designation region.

Further, the designation of the second designation region may be similarly automated. In this case, the second region designation unit 77 extracts a region of a color similar to a color corresponding to a target color temperature from a captured image and designates the second designation region in an optical image based on the extracted region.

Figure 14:
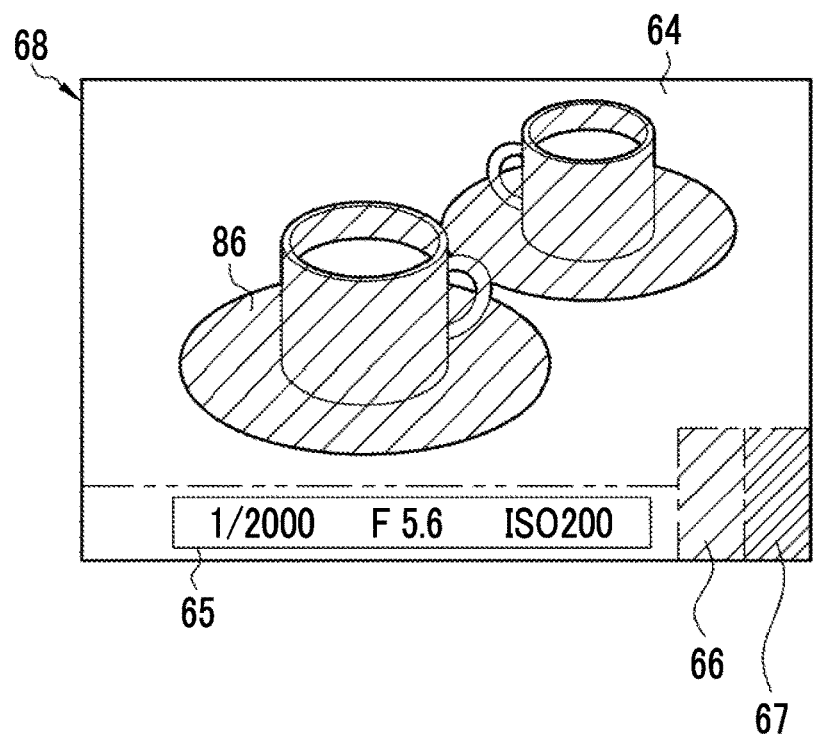
FIG. 14 is a diagram illustrating the second designation region that is autonomously designated by a second region designation unit.

For example, as shown in FIG. 14, in an imaging scene for imaging two white cups, in a case where the color corresponding to the target color temperature is white, the second region designation unit 77 extracts pixels including a pixel value close to white from a captured image obtained by capturing the optical image 64. The second region designation unit 77 designates a region of the optical image 64 corresponding to the extracted region as a second designation region 86. The second color temperature acquisition unit 73 acquires a color temperature of an average color of the second designation region 86 as an image color temperature.

The main controller 32 performs so that the region extracted by the second region designation unit 77 is highlighted using blinking or the like, to thereby cause the user to recognize which region is designated as the second designation region.

In a case where a plurality of regions of the color close to the color corresponding to the target color temperature are scattered, the second region designation unit 77 may set a region having the largest area as the second designation region. Further, in a case where the plurality of regions of the color close to the color corresponding to the target color temperature are scattered, the user may select which region is to be set as the second designation region.

Fourth Embodiment

Figure 15:
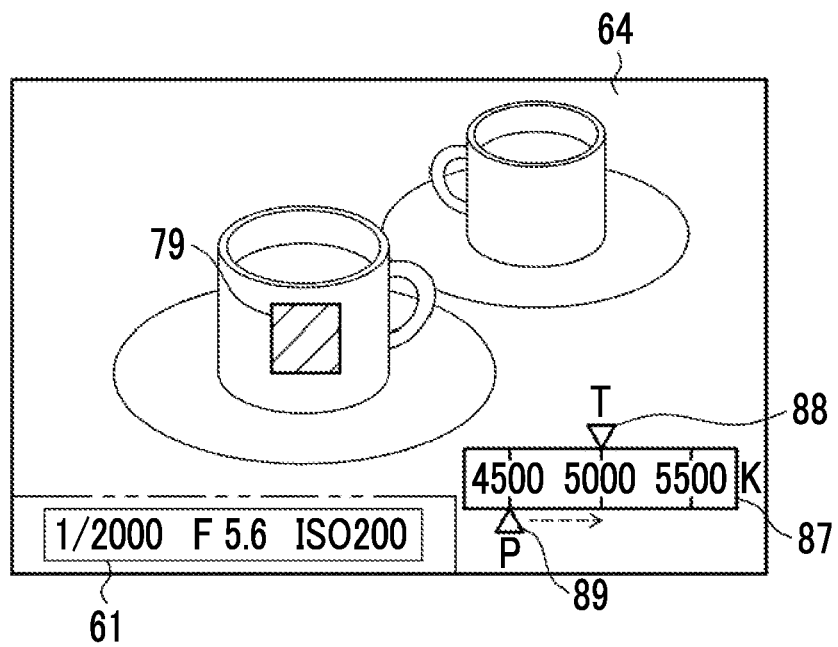
FIG. 15 is a diagram showing a first modification example of display forms of image color temperature information and target color temperature information.

In the first to third embodiments, target color temperature information and image color temperature information are displayed using colors of respective color temperatures, but the invention is not limited thereto, and the target color temperature information and the image color temperature information may be displayed using numerical values or the like indicating the respective color temperatures. In a fourth embodiment, as shown in FIG. 15, the target color temperature information and the image color temperature information are represented by positions of a first indicator 88 and a second indicator 89 with respect to a color temperature scale 87. In the figure, in order to identify the first indicator 88 and the second indicator 89, a sign "T" is displayed in the vicinity of the first indicator 88 and a sign "P" is displayed in the vicinity of the second indicator 89. In this embodiment, the color temperature scale 87 represents a region of 4500 K to 5500 K.

The first indicator 88 is displayed at a position corresponding to a target color temperature acquired by the first color temperature acquisition unit 71. The second indicator 89 is displayed at a position corresponding to an image color temperature acquired by the second color temperature acquisition unit 73. Other configurations in the fourth embodiment are the same as those in any one of the first to third embodiments.

Figure 16:
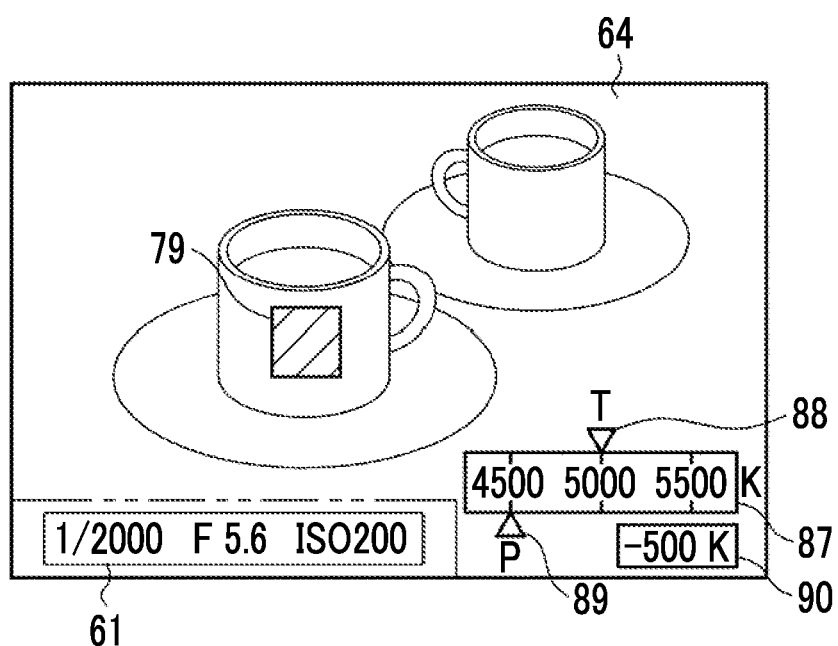
FIG. 16 is a diagram showing a second modification example of display forms of image color temperature information and target color temperature information.

Further, in order to clarify a difference between the target color temperature and the image color temperature, a color temperature difference between the target color temperature and the image color temperature is calculated by the main controller 32, and as shown in FIG. 16, in addition to the target color temperature information and the image color temperature information, color temperature difference information 90 indicating the color temperature difference may be displayed. In this case, the main controller 32 functions as a color temperature difference calculation unit.

In this embodiment, as the color temperature scale 87, the numerical values of the color temperature are displayed, but instead, a color chart in which colors of different color temperatures are arranged may be displayed.

Figure 17:
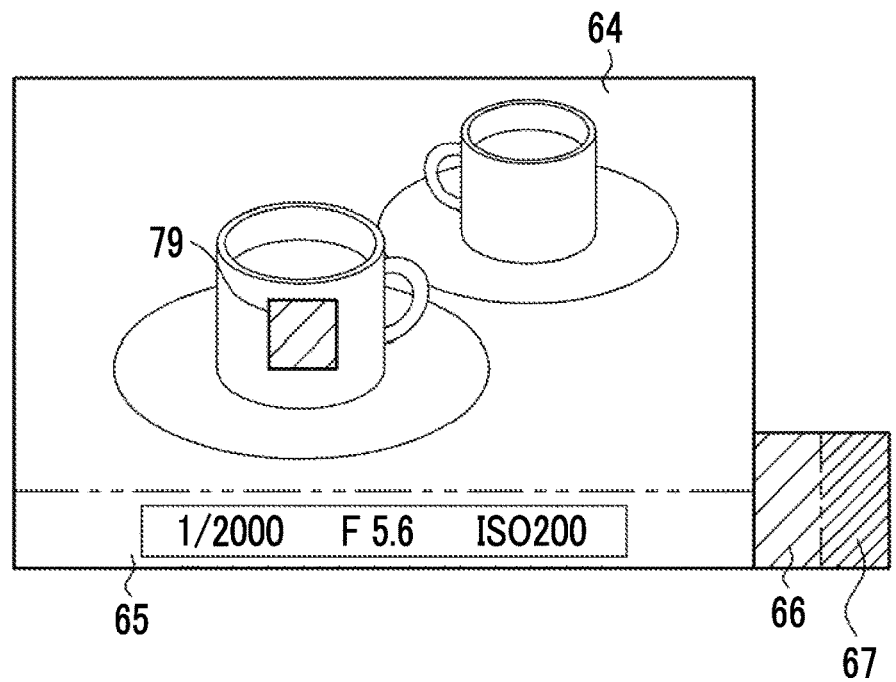
FIG. 17 is a diagram showing a first modification example of display positions of image color temperature information and target color temperature information.
Figure 18:
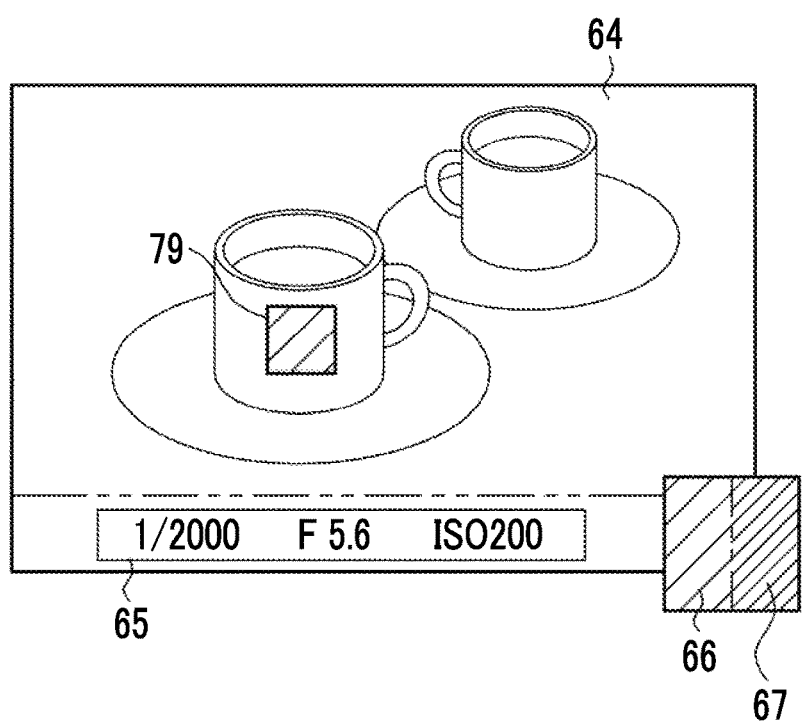
FIG. 18 is a diagram showing a second modification example of display positions of image color temperature information and target color temperature information.

In the respective embodiments, in the color temperature adjustment mode, image color temperature information and target color temperature information are displayed to be overlapped on an optical image, but as shown in FIG. 17, the image color temperature information 66 and the target color temperature information 67 may be displayed to be adjacent to the vicinity of the optical image 64. Further, as shown in FIG. 18, the image color temperature information 66 and the target color temperature information 67 may be partially overlapped on the optical image 64.

Figure 9:
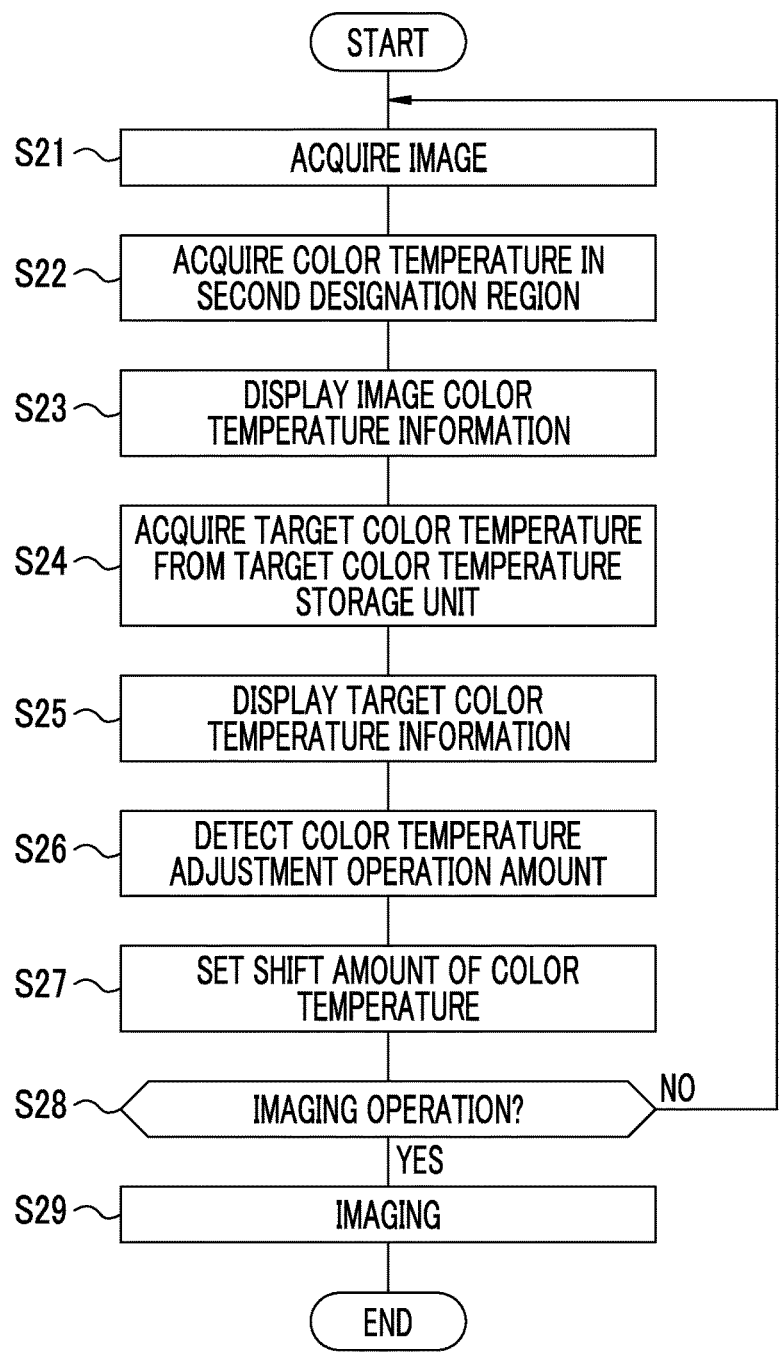
FIG. 9 is a flowchart illustrating the color temperature adjustment mode.

In the respective embodiments, as shown in FIG. 9, step S22 and step S23 for acquiring and displaying an image color temperature are performed at every imaging cycle, but the invention is not limited thereto, and step S22 and step S23 may be performed at every 2 or more specific imaging cycles. Further, step S24 and step S25 for acquiring and displaying a target color temperature are performed at every imaging cycle, but the invention is not limited thereto, and step S24 and step S25 may be performed at every 2 or more specific imaging cycles.

As shown in FIG. 9, in the color temperature adjustment mode, whenever an image color temperature is acquired, step S24 for acquiring a target color temperature close to the image color temperature from the target color temperature storage unit 72 is executed, but a configuration in which step S24 is not executed in the color temperature adjustment mode may be used. That is, a user may select the target color temperature to be used in the color temperature adjustment mode before the color temperature adjustment mode.

In the respective embodiments, as shown in FIG. 9, step S26 and step S27 for performing a setting process of a shift amount of a color temperature based on a color temperature adjustment operation are performed at every imaging cycle, but the invention is not limited thereto, and step S26 and step S27 may be performed at every 2 or more imaging cycles.

In the respective embodiments, the second color temperature acquisition unit 73 acquires an image color temperature from YC image data generated by the digital signal processing unit 35, but may acquire the image color temperature from image data of an RGB format before a YC conversion process is performed.

In the respective embodiments, only manual color temperature adjustment from a user can be performed, but an auto white balance (AWB) adjustment processing function may be provided to the digital signal processing unit 35. In this case, with respect to image data after the AWB adjustment, manual color temperature adjustment is performed. In the AWB adjustment process, the kind of a light source may be mistakenly detected according to an imaging scene, but even in such a case, it is possible for a user to adjust a color temperature with high accuracy.

In the respective embodiments, the digital signal processing unit 35 is separately provided with respect to the imaging element 31, but may be combined in the imaging element 31.

EXPLANATION OF REFERENCES

11: digital camera
17: finder device (finder unit)
31: imaging element
39: EVF display controller (display controller)
42: EVFLCD (in-finder information display unit)
71: first color temperature acquisition unit
73: second color temperature acquisition unit
74: color temperature adjustment unit
76: first region designation unit
77: second region designation unit

What is claimed is:
1. An imaging apparatus comprising:
an imaging element that generates an image based on an optical image that is incident through an imaging lens;
a finder configured to be capable of observing the optical image;
an in-finder information display on which information is displayed to be observable in a state of being overlapped on or being close to the optical image inside the finder;
a color temperature adjustment processor that adjusts a color temperature of the image based on a color temperature adjustment operation;
a display controller that controls the in-finder information display so that target color temperature information indicating a color temperature that is a target of the adjustment of the color temperature and image color temperature information indicating the color temperature of the image are displayed as the information;
an image storage;
a first region designation unit that designates a first designation region in a stored image stored in the image storage;

a first color temperature acquisition unit that acquires a color temperature of the first designation region designated by the first region designation unit;

a second region designation unit that designates a second designation region in the optical image observed in the finder; and a second color temperature acquisition unit that acquires the color temperature of the image corresponding to the second designation region designated by the second region designation unit, wherein the display controller controls the in-finder information display so that a first area and a second area are set to be adjacent to each other, a color of the color temperature indicated by the image color temperature information is displayed in the first area, and a color of the color temperature indicated by the target color temperature information is displayed in the second area, the target color temperature information indicates the color temperature of the first designation region acquired by the first color temperature acquisition unit, and the image color temperature information indicates the color temperature of the image corresponding to the second designation region.

2. The imaging apparatus according to claim 1, wherein the display controller displays the image color temperature information of the image after the color temperature is adjusted by the color temperature adjustment processor in a case where the color temperature adjustment operation is performed.

3. The imaging apparatus according to claim 1, wherein the stored image is an image obtained by imaging.

4. The imaging apparatus according to claim 1, wherein the stored image is a color chart in which colors of different color temperatures are arranged.

5. The imaging apparatus according to claim 4, wherein the first designation region is displayed to be identifiable with respect to the color chart.

6. The imaging apparatus according to claim 3, wherein the first color temperature acquisition unit calculates an average color in the first designation region and calculates a color temperature based on the calculated average color.

7. The imaging apparatus according to claim 1, wherein the second color temperature acquisition unit calculates an average color in the second designation region and calculates a color temperature based on the calculated average color.

8. The imaging apparatus according to claim 1, further comprising:

a color temperature difference calculation unit that calculates a color temperature difference between the color temperature of the first designation region and the color temperature of the second designation region, wherein the display controller displays color temperature difference information indicating the color temperature difference, in addition to the target color temperature information and the image color temperature information, as the information.

9. The imaging apparatus according to claim 1, further comprising:

a light shielding unit configured to be capable of partially shielding the optical image in the finder, wherein the in-finder information display sets the first area and the second area in portions that are partially shielded by the light shielding unit for the information.

10. A control method of an imaging apparatus that includes an imaging element that generates an image based on an optical image that is incident through an imaging lens, a finder configured to be capable of observing the optical image, an in-finder information display on which information is displayed to be observable in a state of being overlapped on or being close to the optical image inside the finder, a color temperature adjustment processor that adjusts a color temperature of the image based on a color temperature adjustment operation, an image storage, a first region designation unit that designates a first designation region in a stored image stored in the image storage unit, a first color temperature acquisition unit that acquires a color temperature of the first designation region designated by the first region designation unit, a second region designation unit that designates a second designation region in the optical image observed in the finder unit, and a second color temperature acquisition unit that acquires the color temperature of the image corresponding to the second designation region designated by the second region designation unit, the method comprising:

a display controller controlling the in-finder information display so that target color temperature information indicating a color temperature that is a target of the adjustment of the color temperature and image color temperature information indicating the color temperature of the image are displayed as the information, and so that a first area and a second area are set to be adjacent to each other, a color of the color temperature indicated by the image color temperature information is displayed in the first area, and a color of the color temperature indicated by the target color temperature information is displayed in the second area, wherein the target color temperature information indicates the color temperature of the first designation region acquired by the first color temperature acquisition unit, and the image color temperature information indicates the color temperature of the image corresponding to the second designation region.

* * * * *